March 4, 1952 A. N. BERNARDI 2,587,586
LAWN TRIMMER AND SHRUBBERY PRUNER
Filed June 24, 1949
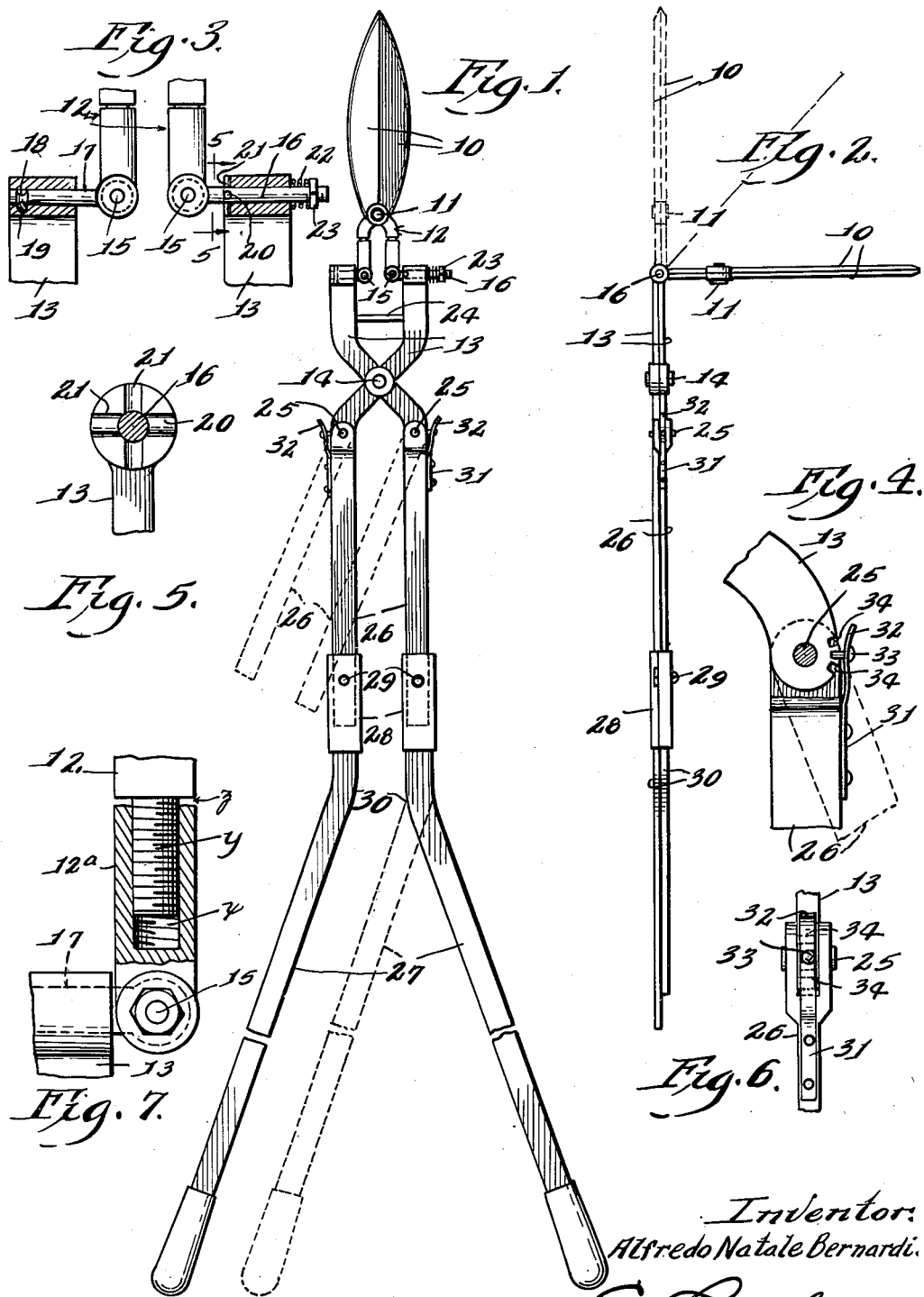
Inventor:
Alfredo Natale Bernardi
By. E. N. Lundy
Attorney.

Patented Mar. 4, 1952

2,587,586

UNITED STATES PATENT OFFICE 2,587,586

LAWN TRIMMER AND SHRUBBERY PRUNER

Alfredo Natale Bernardi, Highland Park, Ill.

Application June 24, 1949, Serial No. 101,183

4 Claims. (Cl. 30—252)

This invention relates to shears which are adapted for use in gardens for facilitating the edging of lawns, trimming of shrubbery, pruning of trees and similar work. The present improvements are more particularly directed to an arrangement whereby the cutting operations may be readily performed in restricted regions such as along the edges of lawns close to or beneath overhanging branches of shrubbery, or for thinning the sides and top of tall hedges. The arrangement permits the cutting blades being moved to a variety of positions with respect to the actuating arms of the device whereby the various operations may be performed without unnecessary inconvenience to the person operating the shears.

It is one of the principal objects of this invention to simplify the construction of shears such as contemplated herein, and to increase the scope of operation of such shears whereby the efficiency thereof is improved.

Another primary object hereof is to provide a shears structure wherein the cutting blades may be moved to or set in different angular relationship with respect to the operating handle portions thereof, so that the operator may stand in a normal, upright position while trimming the edge of a lawn, thus avoiding the necessity of stooping over the work or kneeling upon the ground while using the shears when trimming the edges of the lawn. In this connection the handle regions of the shears are constructed in a novel manner which adapts these handles to be adjusted to several angular positions somewhat oblique to or in offset relation to the longitudinal plane of the shears. This permits the operator to stand in an upright position while clipping the edges of lawns close to bushes, hedges and the like, so that it is not necessary for the operator to push or hold back the shrubbery while performing such lawn edging operations. This saves considerable time as well as labor for the operator who may work with more ease and facility.

A further object hereof resides in providing a universal joint connection between the shearing blades and the handle members or arms, whereby, when the blades are set at an angle to the general plane of the handles or arms, there will be no tendency of the parts to bind at the connections between the blades and handles when the handles are operated during cutting operations.

Still another object of the present invention resides in the provision of a novel handle arrangement for a garden shears, which handles are constructed so that they may be quickly and easily changed to different positions without the use of tools.

Additional objects, aims and advantages of the invention contemplated herein will be apparent to persons skilled in the art, after the construction and operation of the shears arrangement is understood from the within description.

It is preferred to accomplish the numerous objects of this invention and to practice the same, in substantially the manner hereinafter fully described and as more particularly pointed out in the appended claims.

Reference will now be made to the accompanying drawings which form a part of this specification. In the drawings:

Fig. 1 is a plan of the improved shears showing in dotted lines, one oblique arrangement of the handles;

Fig. 2 is an edge view of the shears showing the blades moved to an angle to the handles;

Fig. 3 is a detailed view of the hinged arrangement for the blades drawn to a larger scale;

Fig. 4 is an enlarged detail of the arrangement for changing the handles to an oblique position;

Fig. 5 is an enlarged section on the plane of line 5—5 of Fig. 3;

Fig. 6 is an edge view of the arrangement shown in Fig. 4; and Fig. 7 is an enlarged view showing details of the universal joint connection between the shearing blades and the operating arms or handles.

The drawings are to be understood as being more or less of a diagrammatic character for the purpose of disclosing a typical or preferred embodiment of the improvement to be contemplated herein, and in said drawings the same characters identify like parts in the different views.

Referring to Figs. 1 and 2 the shears comprise coacting blades 10 pivotally connected at 11 and having shanks 12 which are carried by crosstongs 13 having normally parallel end regions, and are fulcrumed at crossed intermediate regions on pivot 14. For the purpose of effecting a swinging adjustment of the blades on the tongs, the shanks 12 have pivotal connection at 15 with rock spindles 16 and 17 which are journaled in bored transverse bosses at the adjacent ends of the tongs 13. Spindle 17 has an angular groove 18 to receive a lock pin 19 which is driven through the boss in which the spindle is journaled to prevent displacement of said spindle, while at the same time permitting rotation thereof in its journal. The spindle 16 has a transverse stop pin 20 outside its journal boss for engagement with one or the other of intersecting or crossed grooves 21 in the adjacent end face of the boss. Suitable means, preferably in the form of a coil expansion spring 22 and a limit nut 23 threaded on spindle 16 are adapted to urge said spindle outwardly in its journal boss. This arrangement urges the spindle in a direction to releasably retain pin 20 in one of the grooves 21, while at the same time permitting the blades 10 to be grasped and move from normal longitudinal position to the angular position shown in Fig. 2 where the blades will be held by engagement of the pin 20 in another cross groove 21. When the blades are in angular position the arrangement permits the operator to stand upright while edging a lawn, and the operator may also trim shrubbery above his head to one side of his stance position. An abutment 24, carried by one of the tong members and contacting the other member, is adapted to arrest overriding movement of the blades during cutting operations.

When the blades 10 are set out of the plane of the arms as indicated in Fig. 2, I have discovered that during operation of the arms there is a tendency to bind at the region where the blade shanks are connected to the arms, thereby making it somewhat difficult to operate the assembly. In order to avoid such binding action I have combined the hinging movement on pivot 15 with a swivel movement thereby providing what may be well termed a universal joint connection between the blades and their operating arms such as illustrated in detail in Fig. 7.

As shown in detail in Fig. 7, the shanks of the shears each comprise a two-part assembly wherein the part 12 has a reduced threaded stub $y$ which is loosely received in a second part or socket 12a having a threaded bore $x$. During the manufacture of this structure the parts 12a are screwed partway on the stub $y$ leaving a small space of clearance $z$ between the proximate ends of parts 12 and 12a to prevent these ends abutting each other. The parts 12a, which may already be hingedly connected by pivot pin 15 to the spindle 17, are then assembled with the ends of cross-tongs 13 in the manner hereinbefore explained. By reason of this especially designed arrangement, a universal joint connection is provided between the blades and the operating arms or handles by permitting slight rotative movement between parts 12 and 12a particularly when the blades are in planes at an angle to the handles. This permits easy operation of the shearing device without binding or undue friction.

The cross members of the tongs have hinged connections by means of fulcrum pivots 25 with operating handles 26 and reversible extensions 27 of said handles. The extensions have sockets 28 which removably receive the adjacent ends of handles 26 which are retained by removable members, such as cotter pins 29 which pass through said sockets and said handles. As shown in Fig. 1, the extensions 27 adjacent the sockets 28 have elbows or bends 30 which normally position said extensions 27 in diverging relation to each other, extending away from handles 26. Thus, when one of said extensions is reversed and then inserted on its handle member, both extensions are positioned in parallel relation to each other, and both extensions are also on one side of the longitudinal plane of the shearing blades 10. When using the device in this latter position the operator may stand at one side of the lawn edge being trimmed and away from any hedge or shrubbery which is close to and immediately overhanging the lawn edge being trimmed.

Another novel feature of the present arrangement is the provision of latch means upon the hinged portions of the handles and the tongs at the location of the fulcrum pivots 25, such latch means being shown in detail in Fig. 4. These latches may take the form of spring blades 31, riveted to the edges of handles 26 and having yieldable free portions 32 which carry lateral detent pins 33. The adjacent edges of the tong members have well-defined seats 34 in which the pins 33 may be selectively inserted. It will be understood that each pin may be lifted out of its seat 34 after which the respective handle 26 may be moved on its pivot to align another seat with the pin and then the spring is released so that the pin may enter the selected seat, thereby to desirably position the handle obliquely to the axis of the blades as shown in dotted lines in Fig. 1. By adjusting both handles in the manner above explained, said handles will be arranged in parallel relation to each other as well as being oblique to the blades, thus facilitating the use of the shears in restricted regions of a lawn, and also making it convenient for the operator to prune ovehead portions of shrubbery, hedges and the like.

From the foregoing explanation it will be apparent that the lawn trimmer and bush pruner comprising the present improvements is capable of a variety of adjustments whereby to position the cutter blades in different angular relationship to the operating arms or handles, and that the cutting operations may be performed without any binding action between the hinged members which may frequently occur when the blades are in planes oblique to or perpendicular to the plane of the arms or handles. Also it is apparent that the arms or handles, together with their extensions, may be arranged in several convenient positions relative to the blades to readily overcome difficulties quite generally experienced in the use of trimming or pruning devices in places which are difficult for the operator to stand erect, such as while edge trimming lawns close to hedges, or for pruning the overhead tops of shrubbery and the like.

While the invention has been described in detail in its present form or embodiment, it will be apparent to persons skilled in the art, after understanding the improvements, that various changes and modifications may be made, without departing from the spirit or scope thereof. It is aimed in the appended claims to cover all such changes and modifications.

What is claimed is:

1. Garden shears comprising pivoted blades; shanks of swivel form extending from said blades; a pair of manually operable pivoted cross-tongs spaced from said blades; coaxial spindles journaled on said tongs and arranged transverse thereto, each spindle having pivotal connection with a shank for effecting simultaneous hinging movement of said blades with respect to said tongs, said shanks and spindles cooperating to provide freely operating connections between said blades and tongs thereby to accommodate said blades to the operating movement of said tongs when said blades are positioned at an angle to said tongs thereby to prevent binding of the parts during angular cutting operations; elongate arms having hinge connections with the ends of said tongs which are remote to said blades and being normally in parallelism with said tongs, said hinge connections permitting adjustment of said arms to position said arms oblique to said tongs; and devices cooperatively associated with said arms and tongs for releasably holding said arms in a plurality of positions with respect to said tongs, whereby cutting operations are performed by the assembly with the arms inclined to the perpendicular.

2. Garden shears of the character defined in claim 1 wherein the shanks of the blades comprise two-part telescoped members, the inner members being externally threaded and loosely screwed into the internally threaded outer members.

3. Garden shears of the character defined in claim 1 wherein the end regions of the tongs at their pivotal connections with the arms have arcuate formation with a plurality of recesses therein, and spring detents carried by the proximate regions of the arms coacting with the aforesaid recesses for latching said arms in a plurality of selected positions with respect to the tongs.

4. Garden shears of the character defined in claim 1 wherein the blade shanks each have two telescoped members with the inner members externally threaded and loosely screwed into the internally threaded outer members; and the end regions of the tongs at their pivotal connections with the arms are arcuately formed with spaced recesses in the edges thereof, and spring detents carried by the adjacent regions of the arms coacting with the aforesaid recesses for latching the arms in a plurality of selected positions with respect to the tongs.

ALFREDO NATALE BERNARDI.

REFERENCES CITED

The following references are of record in the file of this patent:

UNITED STATES PATENTS

| Number | Name | Date |
| --- | --- | --- |
| 556,151 | Johnson | Mar. 10, 1896 |
| 576,862 | Lebold | Feb. 9, 1897 |
| 733,919 | Schwartz | July 14, 1903 |
| 873,333 | Sweet | Dec. 10, 1907 |
| 1,507,529 | Sundman | Sept. 2, 1924 |
| 1,741,288 | Coon et al. | Dec. 31, 1929 |
| 2,406,670 | Delgado | Aug. 27, 1946 |

FOREIGN PATENTS

| Number | Country | Date |
| --- | --- | --- |
| 210,156 | Switzerland | June 15, 1940 |
| 409,060 | Great Britain | Apr. 26, 1934 |